July 8, 1952 T. E. REEDY 2,602,633

NARROW GAUGE ADAPTER FOR VEHICLE LIFTS

Filed June 7, 1949

INVENTOR.
Thomas E. Reedy
BY
Murray, Sackhoff & Murray
ATT'YS

Patented July 8, 1952

2,602,633

UNITED STATES PATENT OFFICE 2,602,633

NARROW GAUGE ADAPTER FOR VEHICLE LIFTS

Thomas E. Reedy, Cincinnati, Ohio

Application June 7, 1949, Serial No. 97,682

2 Claims. (Cl. 254—93)

The invention relates to hydraulic lifts for motor vehicles and has for an object the provision of a selectively removable runway member for disposition inwardly of one of the pair of existing runways of such a lift for the reception of motor vehicles having a narrow wheel gauge and which therefore cannot be supported on the existing devices that are built for the conventional wheel gauge vehicles.

Another object is to provide a light weight and easily portable auxiliary runway or adapter that is safe and is quickly applied or removed with a minimum of time and effort.

Still another object of the invention is to provide an adapter of this kind that is relatively inexpensive.

These and other objects are attained by the means described herein and exemplified in the accompanying drawings in which.

In the servicing of small vehicles of the narrow wheel gauge type the many existing lifts are unsuited to accommodate such vehicles with the result that great inconvenience is experienced and much time is wasted in servicing them.

By the present invention the existing lifts are provided with a shorter auxiliary runway or adapter that is applied or removed in simple and rapid manner so that service for the underside of all vehicles may conveniently be carried on, using the same lift.

Figure 1:
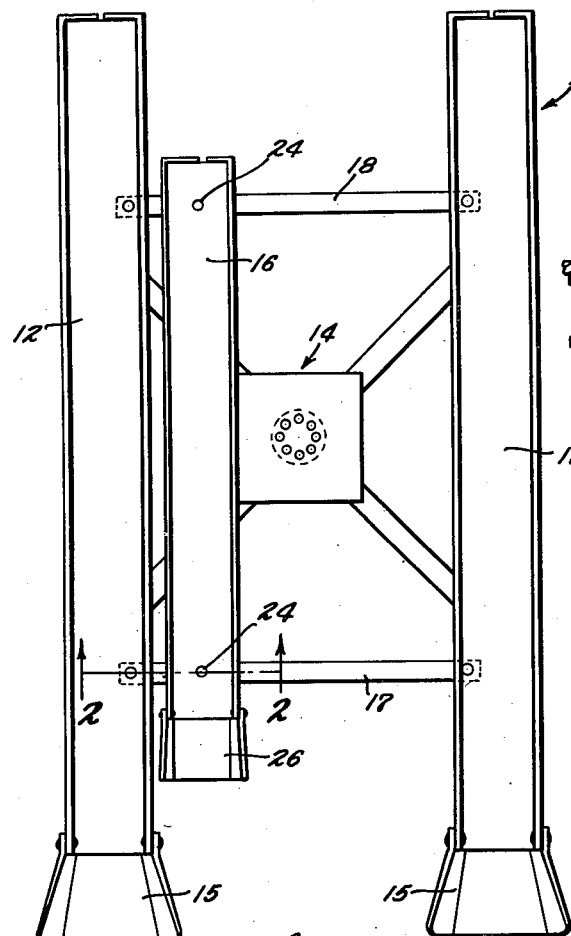
Fig. 1 is a top plan view of a roll-on hydraulic lift, and showing one form of the device of the invention operatively mounted thereon.
Figure 2:
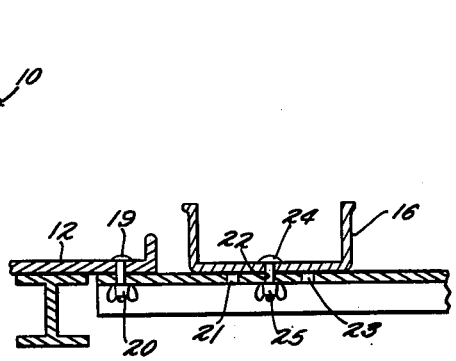
Fig. 2 is a cross sectional view taken on line 2—2 of Fig. 1.

Referring to Figs. 1 and 2 of the drawings the existing vehicle lift 10 of any of the well-known makes comprises a pair of runways 11 and 12 that are rigidly connected at the longitudinal center by a transverse bridge member 14 which is supported for raising and lowering in known manner by a hydraulic piston and cylinder arrangement (not shown) and whereby the runways may be lowered to and selectively raised from floor level. End ramps 15 enable the vehicle to be repaired or serviced, to be moved on and off the runways under its own power. When the lift is raised the aforesaid hydraulic piston projects vertically above the floor and a mechanic on the floor beneath the vehicle and between the runways has the vehicle at a convenient elevation for the job at hand and gains some desirable head room between the wheels of the vehicle. These existing devices, sometimes called roll-on lifts, are costly and occupy considerable space but utilize the space very advantageously. Unfortunately a number of small type motor vehicles have wheel gauges that are narrower than the conventional standard and these have presented the problem of servicing them without the benefit of the existing hydraulic lifts. Moreover, the entire category of small vehicles includes several sizes of narrow gauge dimensions especially when motorcycles with side cars are included in the group.

It has not been considered practical to provide such existing hydraulic vehicle lifts with runways of sufficient width to accommodate vehicles of all wheel gauges because this would unduly restrict the accessibility of the parts of the larger and wider vehicles, and the latter are more numerous.

In order to provide for the servicing of vehicles of all known wheel gauges, I have provided a short runway 16 together with means to removably mount the same in suitably spaced parallelism with one of the existing runways 12 of the lift 10 so that auxiliary runway 16 and the other existing runway 11 of the lift are properly spaced apart to suit the wheel gauge of the vehicle at hand.

The auxiliary runway, by reason of its use for small light cars is desirably made shorter and may be narower than the existing runway 12. Moreover, it may be made of lighter weight as to thickness and material, since it will be required to support a relatively light load, and is shorter and is adequately supported for a distance on each side of its longitudinal center by the bridge 14 of the lift on which it rests in use. As will be noted hereinafter more fully the span of the runway 16 between supports is quite short and in practice the bending strain imposed by the load will be readily borne by a light weight alloy metal channel of which the material of said runway is preferably formed. The part 16 is easily moved to and from operative position by one man and the mounting and removal is quickly and easily made without the use of tools.

In the form shown in Figs. 1 and 2 a pair of similar angle strips 17 and 18 are attached permanently or removably, as desired, between existing runways 11 and 12. The attachment is effected by passing a single bolt 19 through the channel shaped runways 11 and 12 at each end of each angle member 17 and 18 and securely drawing up the angle members with a nut 20 which nut may be a thumb nut if desired. As indicated the angle bars 17 and 18 may remain in position when the adapter or auxiliary runway is not in place with little or no inconvenience to the mechanic who is working on a car of standard wheel gauge.

The members 17 and 18 are provided adjacent one end with a series of spaced holes 21, 22 and 23 to selectively receive a single bolt 24 that passes through the floor of the adapter runway 16 for securing the runway 16 adjacent each end to the tops of said angle bars with the aid of a thumb nut such as 25. The adaptation of the device to side car vehicles and other vehicles of larger but substandard wheel gauge is readily apparent and requires no further description. The removal of the adapter device of the invention, with or without the angle bars, is a matter of choice, but if the angle bars are disconnected it is unnecessary to also separate the runway 16 from said bars. The angle bars may be pivoted about bolts 24 and disposed in the body lines of runway 16 if desired for storage, handling and shipping purposes. A ramp member 26 is hinged to one end of the adapter runway 16 in suitable manner.

Figure 3:
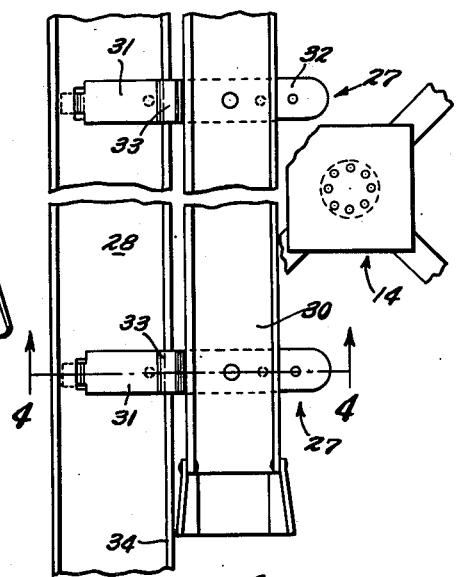
Fig. 3 is a fragmental top plan view of a modified form of my invention operatively mounted on a runway of an existing vehicle lift, part being broken away.
Figure 4:
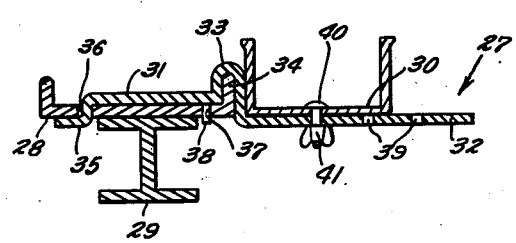
Fig. 4 is a cross sectional view taken on line 4—4 of Fig. 3.

In the modified form of the invention, illustrated in Figs. 3 and 4, I utilize a pair of brackets 27 arranged and adapted for removably connecting the adapter runway with an existing runway 28 of an hydraulic lift. The runways on the original lift are frequently provided with a longitudinal support such as an I-beam 29 to which they are rigidly connected.

Brackets 27 are alike and a description of one will suffice. Two of these brackets are used, one near each end of the auxiliary runway 30 and the latter is in turn adjustably mounted on the brackets to accommodate several different narrow wheel gauges.

In the arrangement shown the auxiliary or adapter runway 30 and its brackets 27 are easily handled as a unit which is applied to or removed from the existing runway 28 without the use of tools; and the adjustment of the runway on the brackets is quickly effected with only the changing of bolts with thumb nuts thereon.

The bracket 27 comprises a strip of suitable strength material having oppositely extending arms 31 and 32 which lie in slightly offset parallel planes and are connected at adjacent ends by an integral inverted U-shaped member 33. The U-shaped member 33 is adapted to approximately conform to the upstanding leg or flange 34 of the existing lift runway 28 and to dispose the bottom face of arm 31 flatwise on and transversely of the top face of runway 28.

The extreme end of arm 31 has a downwardly and outwardly directed L-shaped hook 35 which passes through a slot 36 in existing runway 28 and engages beneath the runway at one side of the support beam 29 thereof. A hole 37 in runway 28 at the opposite side of the support beam 29 is adapted to receive a rigidly connected pin or stud 38 on the bottom of arm 31. The bracket 27 is applied by holding it upright in order to enter the end of hook 35 into slot 36 and then swinging the bracket to a substantially horizontal position to enter pin 38 into hole 37 and the leg 34 of the runway 28 into the inverted opening in the U-bend 33.

The arm 32 of the bracket supports an end of the adapter runway 30 and has several holes 39 suitably spaced apart to selectively receive a bolt 40 which is removably passed through a hole in the adapter runway 30 and held by a thumb nut 41.

The center portion of adapter runway 30 rests on the bridge 14 of the lift to which it is applied so that the brackets individually support only a small part of the entire load imposed on the runway 30. The latter will be observed to have relatively short spans between its center support on the bridge 14 and the end support brackets and a suitably reduced strength and weight of material is indicated for making the adapter readily portable and easily applied or removed by one man.

The support brackets provide an easily applied and quickly removable connection with the existing lift. When connected as shown in Fig. 4 the brackets cannot be shifted radially about bolts 40 in handling the device. If the outer holes 39 receive the bolts 40, in adapting the device to the smaller or narrower gauge vehicles, a limited degree of radial shifting of the brackets may conceivably occur in handling the device, but such movement, if it should occur, is never sufficient to complicate the task of mounting and removing the device by one man.

A pair of removable wheel stops of suitable form (not shown) would be used on the adapter runway 16 or 30 in order to prevent a small car from rolling while elevated by the lift. These would in some cases be part of the equipment for existing runway 12 or 28 and could be transferred as needed.

The narrow gauge car adapters of the invention will be understood to be subject to minor structural changes within the spirit of the invention and the scope of the appended claims.

The salient feature of adaptability of the device to accommodate several different substandard wheel gauges of small vehicles including known small and midget cars and side car arrangements in the same space that is used for all of the standard vehicles affords a maximum of space saving in the shops and service stations and a great convenience and time saving for the mechanics and attendants.

What is claimed is:

1. In a narrow gage motor vehicle adapter for a vehicle lift having parallel runway channels one of which has a slot and a bore therethrough at opposite sides at a distance from each end, a pair of brackets each including an inverted U-shaped center portion adapted to seat over the upstanding edge of said channel adjacent the bore, an integral arm extending outwardly of one side of the said center portion and adapted to seat on the channel, a pin in the bottom of said arm entering the bore in the channel, a hook on the end of the said arm removably entering through the slot and engaging beneath the said channel, an oppositely extending arm connected with the opposite end of the center portion and having a plurality of perforations spaced lengthwise of said arm, a light weight adapter channel seated at opposite ends on the respective brackets and having a center perforation at each end for selective registry with a perforation in the respective arms, and means removably securing the ends of the adapter in adjusted position on the bracket arms.

2. In combination a vehicle lift including a runway channel having at a distance from each end a transversely spaced apart bore and slot, a bracket for removable mounting on said channel in each bore and slot and comprising a pair of oppositely extending arms, an integral inverted U-bend connected at opposite sides to the adjacent ends of said arms, a hook on the end of one arm removably insertable through the slot and engageable beneath the channel, a pin in the bottom of said arm for entry in the bore in the channel and together adapted to non-shiftably seat said arm transversely on the top of channel with the said U-bend astride the upturned edge of the channel, the other of said arms having a longitudinally spaced series of perforations therein, an adapter runway having a center perforation at each end adapted for registry with a selected perforation in one of said other arms of the several brackets and a bolt member removably securing said adapter runway in said position on said arms.

THOMAS E. REEDY.

REFERENCES CITED

The following references are of record in the file of this patent:

UNITED STATES PATENTS

| Number | Name | Date |
|---|---|---|
| 798,683 | Ketteman | Sept. 5, 1905 |
| 1,926,368 | Bristol | Sept. 12, 1933 |
| 2,168,624 | Musgrave | Aug. 8, 1939 |